(12) United States Patent
Dec et al.

(10) Patent No.: US 8,689,767 B1
(45) Date of Patent: Apr. 8, 2014

(54) METHOD FOR OPERATING HOMOGENEOUS CHARGE COMPRESSION IGNITION ENGINES USING CONVENTIONAL GASOLINE

(75) Inventors: John E. Dec, Livermore, CA (US); Yi Yang, Livermore, CA (US); Nicolas Dronniou, San Francisco, CA (US)

(73) Assignee: Sandia Corporation, Albuquerque, NM (US)

( * ) Notice: Subject to any disclaimer, the term of this patent is extended or adjusted under 35 U.S.C. 154(b) by 368 days.

(21) Appl. No.: 13/230,320

(22) Filed: Sep. 12, 2011

Related U.S. Application Data

(60) Provisional application No. 61/436,337, filed on Jan. 26, 2011.

(51) Int. Cl.
*F02B 17/00* (2006.01)

(52) U.S. Cl.
USPC .......................... 123/295; 123/299; 123/305

(58) Field of Classification Search
USPC ............ 123/295, 299, 305, 525, 527, 568.14, 123/90.15–90.18
See application file for complete search history.

(56) References Cited

U.S. PATENT DOCUMENTS 6,497,213 B2 * 12/2002 Yoshizawa et al. ........... 123/299
7,128,046 B1 * 10/2006 Dec et al. ...................... 123/295
7,461,628 B2 * 12/2008 Blumberg et al. ............ 123/304
2011/0079194 A1 * 4/2011 Tanaka et al. ................. 123/295
2013/0213349 A1 * 8/2013 Sellnau et al. ................ 123/295

FOREIGN PATENT DOCUMENTS

JP           2008095539 A    *    4/2008

OTHER PUBLICATIONS

Dec, J.E.; Yang, Y.; Dronniou, N.; "Boosted HCCI-controlling Pressure-Rise Rates for Performance Improvements using Partial Fuel Stratification with Conventional Gasoline," SAE International Journal of Engines, Jun. 2011, USA, SAE paper 2011-01-0897.
Dec, J.E.; Yang, Y.; "Boosted HCCI for High Power without Engine Knock and with Ultra-low NOx Emissions using Conventional Gasoline," SAE International Journal of Engines, 2010, v3(1): pp. 750-767, SAE paper 2010-01-1086.
Sjoberg, C.-M.G.; Dec, J., "An Investigation of the Relationship Between Measured Intake Temperature, BDC Temperature, and Combustion Phasing for Premixed and DI HCCI Engines," SAE Transactions, 2004, v113(3): pp. 1271-1286.

* cited by examiner

*Primary Examiner* — Stephen K Cronin
*Assistant Examiner* — Joseph Dallo
(74) *Attorney, Agent, or Firm* — Timothy P. Evans

(57) ABSTRACT

A method for the operation of homogeneous charge compression ignition engines (HCCI) using gasoline or similar single-stage ignition fuels. Partial fuel stratification (PFS), intake pressure boosting and controlled BDC-intake temperatures, typically in the range of 95° C. to about 125° C., are used to reduce combustion pressure rise rates (PRR), and therefore, the knocking propensity of homogeneous charge compression ignition engines operating on gasoline or similar fuels.

23 Claims, 2 Drawing Sheets

METHOD FOR OPERATING HOMOGENEOUS CHARGE COMPRESSION IGNITION ENGINES USING CONVENTIONAL GASOLINE

CROSS-REFERENCE TO RELATED APPLICATIONS

This Application claims benefit of prior co-pending application 61/436,337 filed Jan. 26, 2011 and entitled "Boosted HCCI—Controlling Pressure-rise Rates for Performance Improvements using Partial Fuel Stratification with Conventional Gasoline," herein incorporated by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

FIELD OF THE INVENTION

The present invention is directed to a method for the operation of homogeneous charge compression ignition engines (HCCI) with gasoline or similar single-stage ignition fuels. The method disclosed herein provides for the use of partial fuel stratification (PFS), intake pressure boosting and reduced charge temperatures to reduce heat release rates (HRR) with commensurate reduction in knocking propensity in homogeneous charge compression ignition engines operating on conventional gasoline or other similar fuels.

BACKGROUND OF THE INVENTION

Spark-ignition and diesel engine manufacturers are being challenged to produce engines that are both highly fuel efficient and meet increasingly stringent emission requirements. Diesel engines have high fuel efficiency but require expensive after-treatment to meet recently enacted very strict emissions regulations. Also, most diesel after-treatment systems require a urea/water solution and the tank must be refilled at regular intervals adding to the operating expense. In contrast, spark-ignition (SI) engine exhaust emissions can be cleaned up using relatively inexpensive after-treatment based on a three-way catalyst. However, SI engines suffer from relatively low fuel efficiency, typically consuming 30% to 50% more fuel than a diesel engine to do the same work. For these reasons, there is a strong need for an engine that has both high fuel efficiency (comparable to diesel efficiencies or higher) and that does not require expensive after-treatment.

Homogeneous charge compression ignition (HCCI) is an attractive advanced combustion process that offers potential as a high-efficiency alternative to spark ignition engines. By providing diesel-like efficiencies but with substantially lower nitrogen oxide ($NO_x$) and particulate matter (PM) emissions, HCCI also offers a low emissions alternative to diesel engines, without expensive after-treatment. Unlike conventional diesel combustion, HCCI does not rely on maintaining a flame front. Rather, combustion occurs as the result of spontaneous auto-ignition at multiple points throughout the volume of the charge gas. This unique property of HCCI allows the combustion of very lean mixtures or mixtures that are made very dilute by the addition of combustion-product gases (e.g., by exhaust gas recirculation), resulting in low combustion temperatures that dramatically reduce $NO_x$ emissions. Also, unlike conventional diesel combustion, the charge is sufficiently well mixed so that PM emissions are very low. Consequently, HCCI provides a low emissions alternative to conventional diesel engines or a high efficiency alternative to conventional SI engines.

Although the use of conventional diesel fuel or gasoline for HCCI would be desirable since these fuels are readily available, achieving acceptable HCCI performance with these fuels can be difficult. With diesel fuel, elevated temperatures are required before significant vaporization occurs making it difficult to form a premixed near-homogeneous charge. Second, diesel fuel is a two-stage ignition fuel with significant low-temperature combustion chemistry, which leads to rapid auto-ignition once compression temperatures exceed about 800K. This can lead to overly advanced combustion phasing and/or require reduced compression ratios that reduce engine efficiency. Conversely, single-stage ignition fuels such as gasoline can require overly high compression ratios or various other techniques to provide significant charge heating, e.g., retaining significant amounts of hot combustion products from the previous combustion cycle (residuals) in the cylinder.

Currently, the power output of HCCI engines is limited to about half that of traditional diesel or SI engines. Extending HCCI operation to higher power outputs remains a significant challenge. This is mainly because the combustion rates with HCCI become very rapid as the fueling rate is increased causing engine knock that results in undesirable noise and reduced durability. Because high-load operation is a challenge, most HCCI or HCCI-like concepts currently being pursued utilize HCCI only below about half load and revert to conventional spark ignition (SI) or diesel combustion for high loads. Thus, at present the advantages afforded by HCCI are limited to only part of the operating range, and engine design must be compromised to accommodate the conventional diesel or SI combustion.

In an earlier work (U.S. Pat. No. 7,128,046, herein incorporated by reference) the inventors introduced a technique for reducing the combustion heat release rate (HRR) in HCCI engines, which gives a commensurate reduction in the knocking propensity. With this technique, termed partial fuel stratification (PFS), a large portion of the fuel (typically, more than half) is premixed and the remaining fuel is introduced by direct injection (DI) in the latter part of the compression stroke in such a manner so that it does not mix thoroughly, resulting in a partially stratified fuel/charge-gas mixture. Thus, the charge consists of a distribution of local fuel/charge-gas mixtures that auto-ignite at different times thereby producing a staged combustion event if the fuel's autoignition chemistry varies with the local fuel concentration within the charge gas.

If the charge consists only of air and fuel, then this variation in local fuel concentration is synonymous with variations in the local fuel/air equivalence ratio, $\phi$, wherein, $\phi$ is defined by $(F/A)/(F/A)_{stoichiometric}$, where F is the mass of fuel and A is the mass of air. However, in HCCI engines, it is often necessary to retain significant amounts of hot residuals (i.e., combustion-product gases) in the cylinder, and/or to use significant amounts of exhaust-gas recirculation (EGR). In these cases, the charge gas consists of fuel, air, and combustion-product gases, and variations in local fuel concentration can be cast in terms of a mass-based equivalence ratio $\phi_m$, wherein $\phi_m$ is defined by $(F/C)/(F/A)_{stoichiometric}$, wherein C is the mass of charge gases, excluding the fuel, and F and A are defined as above. It should be noted that $\phi$ and $\phi_m$ are identical when the charge consists fuel's autoignition chemistry must vary with the local $\phi_m$, i.e., the fuel must be $\phi_m$-sensitive. Thus, successful application of PFS requires both that fuel be introduced in a manner to produce an appropriate $\phi_m$ distribution and that the fuel be $\phi_m$-sensitive, so that autoignition occurs sequentially in the various local $\phi_m$ regions. For most $\phi_m$-sensitive fuels, this means that the richest regions (regions with the highest local $\phi_m$) autoignite first, followed by the next richest, and so on. If this is done correctly, the HRR can be significantly reduced with a commensurate reduction in knocking propensity. However, not all fuels have the required $\phi_m$-sensitivity. Two-stage-ignition fuels are generally $\phi_m$-sensitive (in contrast to single-stage-ignition fuels such as gasoline) and the prior art method was specific to two-stage-ignition fuels. Diesel fuel is a commonly available two-stage-ignition fuel but it is difficult to use diesel fuel for HCCI due to its low volatility and overly rapid autoignition. Other two-stage-ignition fuels have sufficient volatility, but are not readily available. Consequently, the prior art method for improving combustion characteristics of HCCI engines is limited to fuels that are not readily available and/or would require extensive modification of HCCI engines to work properly.

SUMMARY OF EMBODIMENTS OF THE INVENTION

Accordingly, this invention provides a method for reducing the HRR in HCCI engines using readily available fuels that exhibit single-stage ignition behavior, such as gasoline, for fueling HCCI engines and that does not require modification of typical HCCI engines configurations.

The method employs partial fuel stratification (PFS), wherein a majority of the fuel is premixed, and the remainder, typically less than about 25%, can be directly injected in the latter half of the compression stroke, so that it does not mix thoroughly, resulting in a partially stratified fuel/charge-gas mixture, coupled with intake pressure boosting and controlled, typically reduced, charge temperature at bottom dead center (BDC) at the end of the intake stroke. Reducing the intake temperature, reducing the quantity of retained hot residual gas or a combination of both, can produce reduced BDC temperatures. Thus, using the method disclosed herein, single-stage ignition fuels, such as gasoline, can be successfully used in HCCI engines to achieve higher loads and improved efficiency as compared to well-premixed HCCI.

For PFS to be effective, the fuel's autoignition chemistry must vary with the variations in local mass-based equivalence ratio ($\phi_m$) of the partially stratified charge to produce a staged combustion event. The inventors have found that single-stage ignition fuels, such as gasoline or other fuels with similar ignition characteristics, often become $\phi_m$-sensitive with a combination of intake boosting and lower in-cylinder BDC-intake temperatures than those used for naturally aspirated HCCI. BDC temperatures should typically be controlled in the range of about 95° C.-125° C., corresponding to intake temperatures of about 45° C.-85° C. for residual levels typical of those in SI or diesel engines. Thus, PFS can effectively reduce PRR in these single-stage fuels. For intake temperatures below about 45° C., with intake boost, single-stage fuels typically develop two-stage ignition. Maximum load improvements with PFS have been demonstrated for intake pressures ($P_{in}$) from 1.6 bar to 2.8 bar. PFS also allows more advanced combustion timing without knock, improving fuel economy (John E. Dec, Yi Yang and Nicolas Dronniou, *Boosted HCCI—Controlling Pressure-Rise Rates for Performance Improvements using Partial Fuel Stratification with Conventional Gasoline*, SAE International Journal of Engines, 2011, v.4(1): pp. 1169-1189).

DETAILED DESCRIPTION OF EMBODIMENTS OF THE INVENTION

Figure 1:
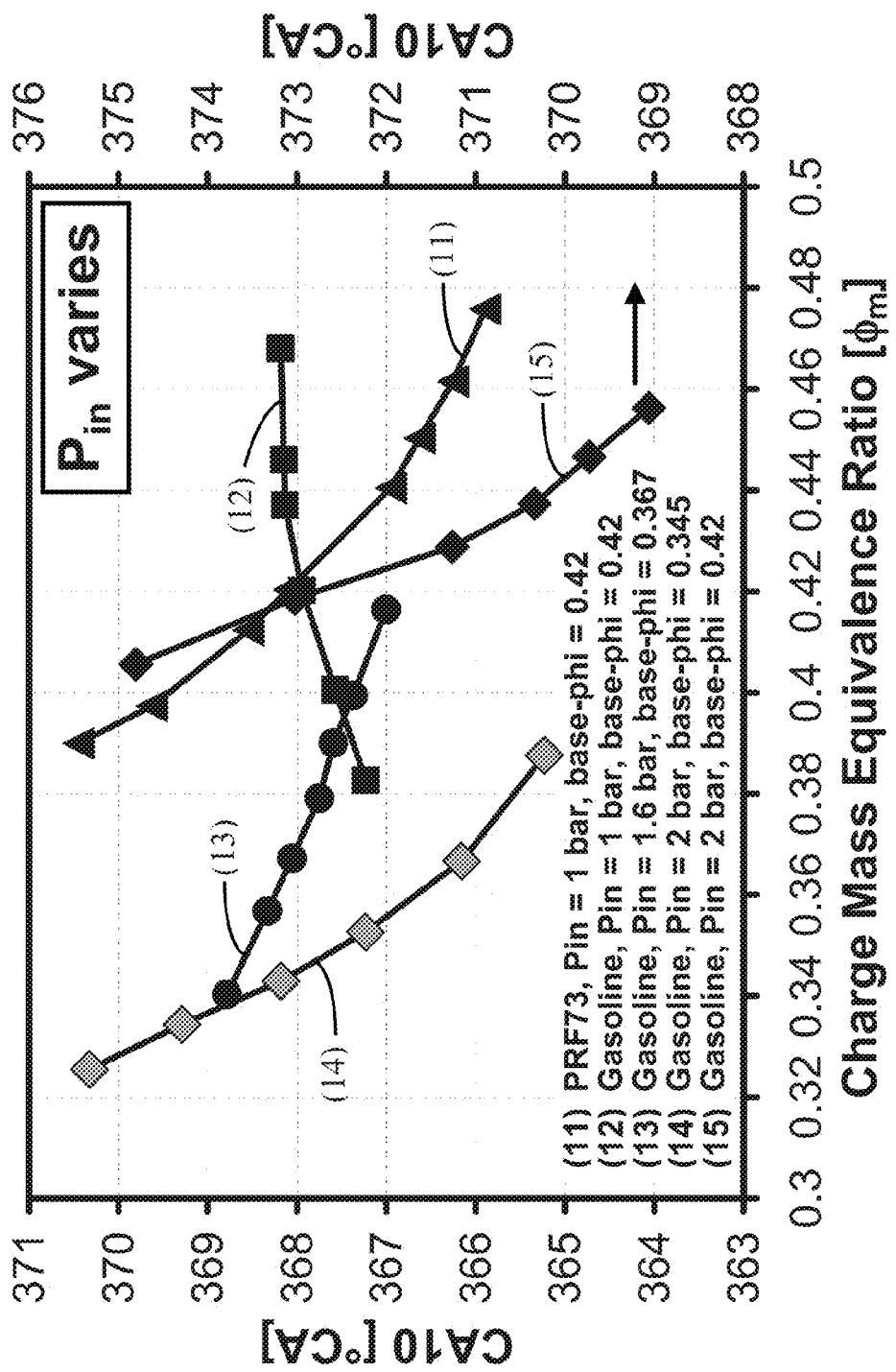
FIG. 1 is a graph of the crank angle of the 10% burn point (CA10) vs. charge mass equivalence ratio ($\phi_m$) for various intake pressures and fuels.

Homogeneous Charge Compression Ignition (HCCI) is an alternative piston-engine combustion process that can provide both high diesel-like efficiencies and ultra-low emissions of nitrogen oxides ($NO_x$) and particulate matter (PM). Because of its strong potential, HCCI is being pursued by most major automotive and diesel engine manufacturers both as a high-efficiency alternative to spark ignition (SI) engines and as a low-emissions alternative to diesel engines. Although significant advancements have been made in recent years that overcome many of the technical issues that previously limited the application of HCCI, extending HCCI operation to higher power outputs remains a challenge. Naturally aspirated HCCI currently offers a little more than half the high load capability of a traditional naturally aspirated SI engines. This is because the HCCI combustion rate becomes very high as fueling is increased, leading to a high pressure-rise rate (PRR) that causes engine knock unless the combustion timing is sufficiently retarded. Knock must be avoided because it causes excessive noise and can result in engine damage. Furthermore, the amount of combustion timing retard is limited because combustion becomes unstable with excessive timing retard. Eventually, the knock/stability limit is reached and fueling cannot be increased further. Because high-load operation is a challenge, most HCCI concepts currently being pursued utilize HCCI up to a little over half load and revert to traditional SI or diesel combustion for high loads. Thus, the advantages of HCCI are limited to only part of the operating range.

It is widely recognized in the art that the charge in an HCCI engine is never fully homogeneous (in both temperature and mixture) in practical application. In some applications, such as diesel-fueled HCCI, there can substantial mixture inhomogeneities. However, the term HCCI or HCCI-like is commonly used to refer to all cases where the charge is sufficiently premixed to achieve low $NO_x$ and PM emissions due to a quasi-volumetric, low-temperature combustion of a dilute charge. Therefore, hereinafter the term "homogeneous" in reference to homogeneous charge compression ignition (HCCI) can refer to a fuel charge that can be substantially inhomogeneous. Further, the term "fuel charge" will mean the product resulting from combining fuel, air and residual gases and/or combustion products or any combination thereof.

The prior art method disclosed in U.S. Pat. No. 7,128,046 employed partial fuel stratification (PFS) coupled with a two-stage-ignition fuel that has appropriate autoignition characteristics to reduce the rate of combustion in HCCI engines, and allow higher loads without engine knock. PFS can be produced by premixing a portion of the fuel charge (typically more than half) and then directly injecting the remaining portion of the fuel mixture (preferably less than about 20% to 25%) in the latter part of the compression stroke or by using multiple injections. The premixed portion, which can be formed in numerous ways such as throttle-body fuel injection, port fuel injection or an early direct injection, provides that at least a minimum $\phi_m$ exists everywhere in the combustion chamber. Late injection of the direct injected (DI) portion in such a manner that it does not have time to mix thoroughly, produces a distribution of local $\phi_m$ within the charge. Subsequent to the prior art method, the inventors have also shown that a "quasi-PFS" condition can be produced by one or more direct injection of the entire fuel from a crank angle (CA) of about 80° to a CA of about 120° during the intake stroke.

However, for PFS to slow HCCI combustion, autoignition must vary with the local mass-based equivalence ratio ($\phi_m$) within the charge (the fuel must be $\phi_m$-sensitive) so that autoignition occurs sequentially, i.e., the richest regions autoignite first, followed by the next richest, and so on. If this is done correctly, the HRR can be significantly reduced with a commensurate reduction in knocking propensity. Not all fuels have the required $\phi_m$ sensitivity. In general, two-stage ignition fuels are $\phi_m$-sensitive, and appropriate volatility is required to produce a controlled mixture distribution. Thus, while the prior art provided a scheme for improving the operation of HCCI engines under at high load conditions, it required the disadvantageous use of two-stage-ignition fuels that are not readily available.

Recent studies (John Dec and Yi Yang, "*Boosted HCCI for High Power without Engine Knock and with Ultra-low NOx Emissions using Conventional Gasoline*, SAE International Journal of Engines, 2010, v.3(1): pp. 750-767) have shown that intake pressure boosting is an effective means for increasing the power output of HCCI engines fueled with conventional gasoline. In this work the maximum attainable load for fully premixed fueling increased progressively with the amount of intake pressure boost from a gross indicated mean effective pressure of about 5 bar for naturally aspirated conditions ($P_{in}$=1 bar) up to 16.34 bar ($P_{in}$=3.25 bar). In contrast to the invention disclosed here, the fuel was well premixed, consequently PFS was not employed. However, two-stage ignition is not always required for the fuel to be $\phi_m$-sensitive or for PFS to reduce the HRR for HCCI combustion. This is particularly relevant because, as the authors have shown (John E. Dec, Yi Yang and Nicolas Dronniou op. cit.), conventional gasoline can become $\phi_m$-sensitive for operation with intake-pressure boosting even though it often does not show two-stage ignition.

Turning now to FIG. 1, which shows the effect of intake pressure on the $\phi_m$ sensitivity of gasoline compared to the $\phi_m$ sensitivity under non-boosted conditions ($P_{in}$=1 bar) of a two-stage-ignition reference fuel PRF73. This figure shows how CA10 (the 10% burn point, representative of the hot ignition point) varies with $\phi_m$. The greater the change in CA10 with $\phi_m$, the stronger the $\phi_m$ sensitivity. As would be expected, PRF73 (a mixture of primary reference fuels consisting of 73% iso-octane and 27% n-heptane), which is a two-stage-ignition fuel, is strongly $\phi_m$-sensitive at $P_{in}$=1 bar as a result of the strong dependence of its robust pre-ignition reactions (reactions responsible for low temperature heat release [LTHR] and intermediate temperature heat release [ITHR]) on the fuel concentration, i.e., the mass-based equivalence ratio $\phi_m$, as shown in curve 11. In contrast to the two-stage-ignition fuel, PRF73, gasoline shows negligible $\phi_m$ sensitivity at an intake pressure of 1 bar, i.e., all $\phi_m$ autoignite at about the same time, as shown in curve 12. However, as the intake pressure is raised to 1.6 bar (curve 13), gasoline begins to demonstrate a marked $\phi_m$ sensitivity and by an intake pressure of 2 bar (curves 14 and 15), the $\phi_m$ sensitivity of gasoline is equivalent to or slightly greater than PRF73. Curves 11, 12 and 15 show $\phi_m$ sensitivities of PRF73 and gasoline at a slightly higher base fueling rate of $\phi_m$=0.42 as compared to a base fueling rate of $\phi_m$=0.367 for curve 13 and $\phi_m$=0.345 for curve 14. These minor differences in fueling rate have a negligible effect on $\phi_m$ sensitivity in comparison with the effect of intake pressure.

Of particular note, for intake pressures of from about 1.6 bar to 2.4 bar, within the range where gasoline is $\phi_m$-sensitive, PFS has been shown to allow higher fueling without excessive PRRs and therefore, more power, at a given intake pressure compared to well-premixed fueling. This is important for good turbocharger function as well as for improved performance. PFS was also shown to allow more advanced combustion timing without knock, which improved thermal efficiency (i.e., reduced fuel consumption). Moreover, the inventors have shown (Dec and Yang, op. cit. and Dec, Yang and Dronniou, op. cit.) that under certain boosted conditions, gasoline shows enhanced intermediate temperature heat release (ITHR), i.e., autoignition reactions prior to the main hot ignition, even when low-temperature heat release (LTHR) is not noticeable in a standard heat release analysis. Under these conditions, gasoline is very strongly $\phi_m$-sensitive (see curves 13-15 of FIG. 1) and works well with PFS, even though it is not showing true two-stage ignition behavior.

In addition to the beneficial effect of intake pressure boosting on the $\phi_m$ sensitivity of gasoline, and other fuels with similar ignition characteristics, and their ability to perform well with PFS, the inventors have found that these conditions need to be coupled with reduced in-cylinder charge-gas temperatures, compared to those typically used for naturally aspirated HCCI, in order for a single-stage ignition fuel such as gasoline to exhibit enhanced ITHR and the benefits of PFS. This can be accomplished by reducing the amount of intake-air heating, reducing the amount of retained hot-residuals, or both, depending on the control strategy used for a particular engine. For a representative HCCI engine with a compression ratio of 14:1, for which the amount of hot residuals is not intentionally increased above levels typical of SI or diesel engines, intake temperatures should be in the range of 45° C.-85° C. This corresponds to in-cylinder BDC-intake temperatures (i.e., before the start of compression) of 95° C.-125° C., computed using the method described by Sjöberg and Dec (*An Investigation of the Relationship Between Measured Intake Temperature, BDC Temperature, and Combustion Phasing for Premixed and DI HCCI Engines*, SAE Transactions, v.113(3): pp. 1271-1286).

Figure 2:
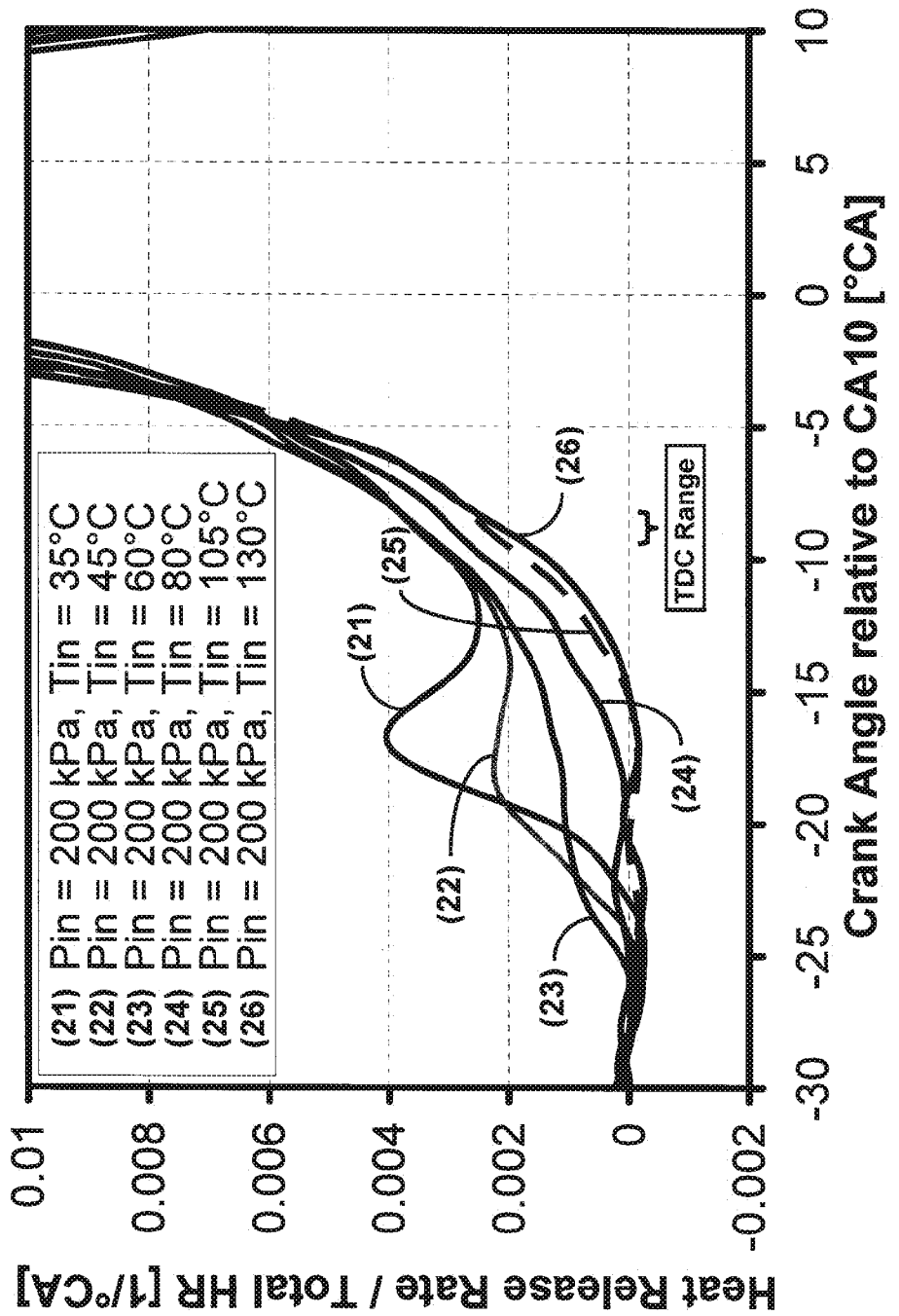
FIG. 2 is a graph of normalized heat release rate vs. crank angle for various intake temperatures.

Turning now to FIG. 2, which shows the relationship between normalized heat release rate (HRR) and crank angle for gasoline as a function of intake temperature ($T_{in}$) at a constant intake pressure of 200 kPa (2.0 bar) with combustion timing, CA10, held nearly constant by adjusting the amount of EGR. It is readily seen that reducing $T_{in}$ from about 105° C. (curve 25) to about 60° C. (curve 23) causes a progressive increase in magnitude of the early heat release (ITHR) and a shift in the onset of these reactions to earlier crank angles. Further reduction $T_{in}$ to 45° C. (curve 22) results in a distinct LTHR peak separated from the later ITHR by a local minimum in the HRR curve. At $T_{in}$=35° C. (curve 21), two-stage ignition behavior is clearly evident with a pronounced LTHR for crank angles from −23° to −12° relative to CA10.

It will be readily understood by those skilled in the art that, while the temperature values given herein are representative examples, the exact correlation between intake temperature and the in-cylinder BDC temperature at the end of the intake stroke will vary somewhat depending on the specific geometry of a given engine and operating parameters such as coolant temperature, in-cylinder wall temperature, engine speed, etc. Furthermore, the required BDC temperature will vary somewhat between engines and operating conditions due to differences in compression ratio and variations in heat transfer during the compression stroke due to difference in engine speed, load, in-cylinder swirl, combustion-chamber wall temperatures, the amount of boost, etc. Nominally, the change in BDC temperature should be sufficient to reduce the temperature 15° crank angle before TDC compression, prior to any combustion heat release, by about 70° C.-90° C., compared to the naturally aspirated case.

The inventors have shown that nominally single-stage fuels, such as gasoline and E10 (10% ethanol in gasoline), are compatible with operation in an HCCI engine under high load conditions by means of PFS and intake pressure boosting coupled with intake and BDC temperatures in a range similar to gasoline, as discussed above. Furthermore, tests with iso-pentanol, which can be derived from biological sources, and iso-octane show that they behave very similarly to gasoline, and they are expected to be compatible with HCCI engine operation using this invention. Based on these test results, the inventors believe that blends of gasoline and ethanol in other concentrations, other petroleum-based fuels, fuels from biological sources, fuels from other renewable sources and some gaseous fuels, such as n-butane, can be adapted to be compatible as well.

Various schemes known in the art can be used for controlling combustion timing with changes in intake pressure including, but not limited to, recycling exhaust gas, adjusting the amount of hot combustion-products retained in-cylinder, varying the amount of ambient air in the intake mixture, and adjusting the temperature of the intake air by various means.

As has been shown above, the novel method disclosed herein is advantageously compatible with intake-pressure boosting (i.e., turbocharging or supercharging) which is used extensively to meet the high power demands of modern engines, particularly diesel engines and has been shown to be capable of providing similar power improvements for HCCI.

We claim:

1. A method for reducing the heat release rate (HRR) in a homogeneous charge compression ignition engine (HCCI) using fuels that exhibit single-stage ignition behavior, comprising;
    a) creating a partially stratified fuel charge at an elevated intake pressure and a controlled bottom dead center (BDC) intake temperature; and
    b) providing a single-stage fuel to the HCCI engine in such a manner that a partially stratified fuel charge is created to produce a range of fuel concentrations and sequential autoignition of the fuel charge.

2. The method of claim 1, wherein the single-stage ignition fuel is selected from the group consisting of gasoline, blends of gasoline and ethanol, iso-octane, iso-pentanol and combinations thereof, fuels derived from petroleum feed stock, fuels from biological sources, fuels from renewable sources, mixtures of fuels from petroleum and biological sources or mixtures of fuels derived from petroleum and renewable sources.

3. The method of claim 1, wherein the fuel is a gas.

4. The method of claim 1, wherein the partially stratified fuel charge is a mixture of a single-stage fuel and air; a mixture of fuel, air and one or more residual gases; or a mixture of fuel, air and exhaust gases.

5. The method of claim 1, wherein the partially stratified fuel charge is supplied to an engine with an intake pressure that is at least about 1 bar.

6. The method of claim 5, whereon the partially stratified fuel charge is supplied to an engine with an intake pressure of from about 1.6 to about 2.8 bar.

7. The method of any of claims 1, wherein the amount of fuel stratification is varied by either adjusting the amount of fuel directly injected in the latter half of the compression stroke or the timing of the injection or both.

8. The method of any of claims 5, wherein the amount of fuel stratification is varied by either adjusting the amount of fuel directly injected in the latter half of the compression stroke or the timing of the injection or both.

9. The method of any of claims 6, wherein the amount of fuel stratification is varied by either adjusting the amount of fuel directly injected in the latter half of the compression stroke or the timing of the injection or both.

10. The method of claim 1, wherein a partially stratified fuel mixture is produced by the step of premixing a portion of the fuel supplied to the HCCI engine.

11. The method of claim 10, wherein the portion of the fuel that is premixed is greater than about half of the fuel charge.

12. The method of claim 1, wherein the charge temperature is adjusted by controlling the temperature at BDC of the intake stroke.

13. The method of claim 12, wherein the charge temperature at BDC intake is controlled by varying the amount of retained hot residual gases, varying the amount of intake air heating or both.

14. The method of claim 1, wherein the temperature of the charge at BDC intake varies from about 95° C. to about 125° C.

15. The method of claim 12, wherein the temperature of the charge at BDC intake varies from about 95° C. to about 125° C.

16. The method of claim 13, wherein the temperature of the charge at BDC intake varies from about 95° C. to about 125° C.

17. The method of claim 1, wherein a majority of the fuel charge is supplied early in the intake stroke and the remainder in the latter half of the compression stroke.

18. The method of claim 17, wherein the remainder of the fuel charge is less than about 25% of the total fuel charge.

19. The method of claim 17, wherein the majority of the fuel charge is a substantially homogenous mixture.

20. The method of claim 1, wherein multiple injections are used to produce the partially stratified fuel charge.

21. The method of claim 1, wherein the partially stratified fuel charge is produced by one or more direct injections of the fuel charge.

22. The method of claim 21, wherein direct injection of the fuel charge takes place at a crank angle of from about 80° to about 120° during the intake stroke.

23. An HCCI engine that operates in accordance with the method of claim 1.

* * * * *